US012671350B2

(12) United States Patent

Kataoka

(10) Patent No.: US 12,671,350 B2

(45) Date of Patent: Jun. 30, 2026

(54) POWER CONVERSION DEVICE

(71) Applicant: NIDEC CORPORATION, Kyoto (JP)

(72) Inventor: Kotaro Kataoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 189 days.

(21) Appl. No.: 18/724,586

(22) PCT Filed: Dec. 23, 2022

(86) PCT No.: PCT/JP2022/047775

§ 371 (c)(1),
(2) Date: Jun. 26, 2024

(87) PCT Pub. No.: WO2023/127760

PCT Pub. Date: Jul. 6, 2023

(65) Prior Publication Data

US 2025/0070688 A1     Feb. 27, 2025

(30) Foreign Application Priority Data

Dec. 27, 2021     (JP) ................................. 2021-213237

(51) Int. Cl.
     *H02M 7/5387*          (2007.01)
(52) U.S. Cl.
     CPC .............................. *H02M 7/53871* (2013.01)
(58) Field of Classification Search
     CPC ............................................. H02M 7/53871
     See application file for complete search history.

(56) References Cited

U.S. PATENT DOCUMENTS

| | | | |
|---|---|---|---|
| 8,659,918 B2 | 2/2014 | Muneshima et al. | |
| 2009/0237021 A1* | 9/2009 | Yamamoto | B60L 15/025 |
| | | | 318/400.15 |
| 2009/0237022 A1* | 9/2009 | Yamamoto | B60L 15/025 |
| | | | 318/400.26 |

(Continued)

FOREIGN PATENT DOCUMENTS

| | | |
|---|---|---|
| JP | 2005160147 A | 6/2005 |
| JP | 2009100613 A | 5/2009 |

(Continued)

OTHER PUBLICATIONS

International Search Report in PCT/JP2022/047775, mailed Mar. 7, 2023. 4pp.

*Primary Examiner* — Rafael O De Leon Domenech

(74) *Attorney, Agent, or Firm* — HAUPTMAN HAM, LLP

(57) ABSTRACT

A power converter includes: a conversion circuit for conversion between DC power and N-phase AC power ($N^3 3$); and a control unit controlling 2N switches. The control unit periodically switches between a first PWM mode in which a high-side or a low-side switch of one phase among the 2N switches is turned on and the switches of the remaining phases are controlled by PWM, and a second PWM mode in which the switches of all phases among the 2N switches are controlled by PWM. The sum of the first period of the first PWM mode and the second period of the second PWM mode is shorter than ½N of one electrical angle cycle of the AC waveform of the AC power. The first period is equal to or longer than one cycle of PWM. The ratio of the first period to the sum of the first and second periods is variable.

9 Claims, 9 Drawing Sheets

CONTROL UNIT

(56) References Cited

U.S. PATENT DOCUMENTS

| | | | | |
|---|---|---|---|---|
| 2013/0033205 A1* | 2/2013 | Furukawa | ........... | H02P 21/0003 |
| | | | | 363/131 |
| 2014/0176027 A1* | 6/2014 | Osaki | ........................ | H02P 6/28 |
| | | | | 318/400.2 |
| 2014/0361720 A1* | 12/2014 | Miyachi | .................... | H02P 6/16 |
| | | | | 318/400.39 |
| 2016/0301336 A1* | 10/2016 | Nishibata | .................. | H02P 6/16 |
| 2017/0093312 A1* | 3/2017 | Hano | ........................ | H02P 6/18 |
| 2020/0212818 A1* | 7/2020 | Kataoka | ............. | H02M 7/5395 |
| 2020/0304049 A1* | 9/2020 | Li | ....................... | H02M 7/5395 |
| 2022/0224272 A1* | 7/2022 | Sun | ...................... | H02M 1/007 |

FOREIGN PATENT DOCUMENTS

| | | | |
|---|---|---|---|
| JP | 2012070497 A | 4/2012 |
| JP | 2014087233 A | 5/2014 |

* cited by examiner

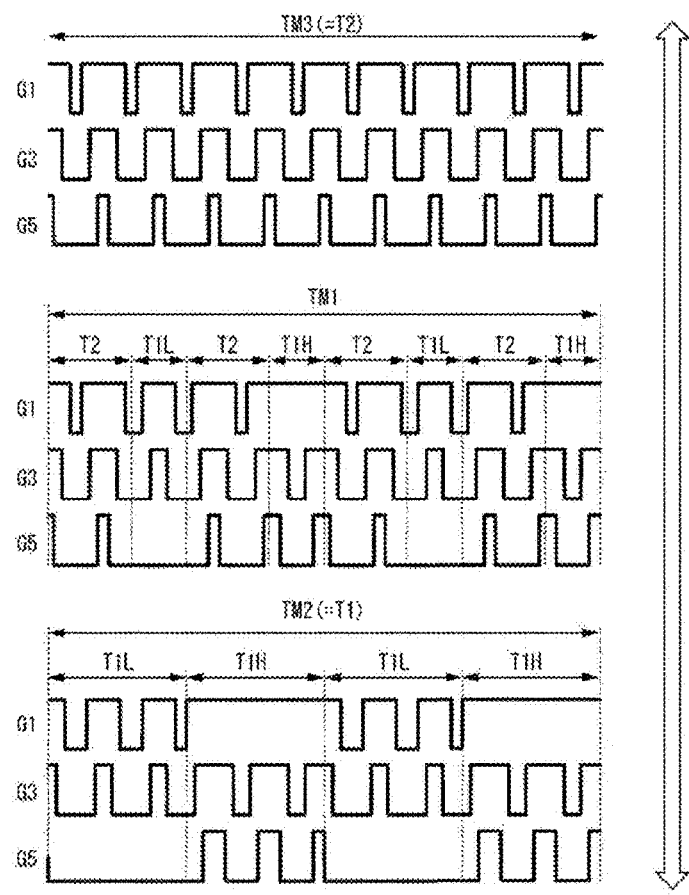

Fig. 9

|  |  | FIRST PWM MODE | SECOND PWM MODE |
|---|---|---|---|
| EXAMPLE OF CASE WHERE MODE SWITCHING CYCLE IS FIXED | THIRD MODULATION MODE | --- | NORMAL |
|  | FIRST MODULATION MODE | PWM 1 CYCLE | PWM 3 CYCLE |
|  |  | PWM 2 CYCLE | PWM 2 CYCLE |
|  |  | PWM 3 CYCLE | PWM 1 CYCLE |
|  | SECOND MODULATION MODE | NORMAL | --- |

|  |  | FIRST PWM MODE | SECOND PWM MODE |
|---|---|---|---|
| EXAMPLE OF CASE WHERE MODE SWITCHING CYCLE IS VARIABLE | THIRD MODULATION MODE | --- | NORMAL |
|  | FIRST MODULATION MODE | PWM 1 CYCLE | PWM 3 CYCLE |
|  |  | PWM 1 CYCLE | PWM 2 CYCLE |
|  |  | PWM 1 CYCLE | PWM 1 CYCLE |
|  |  | PWM 2 CYCLE | PWM 1 CYCLE |
|  |  | PWM 3 CYCLE | PWM 1 CYCLE |
|  | SECOND MODULATION MODE | NORMAL | --- |

Fig. 10

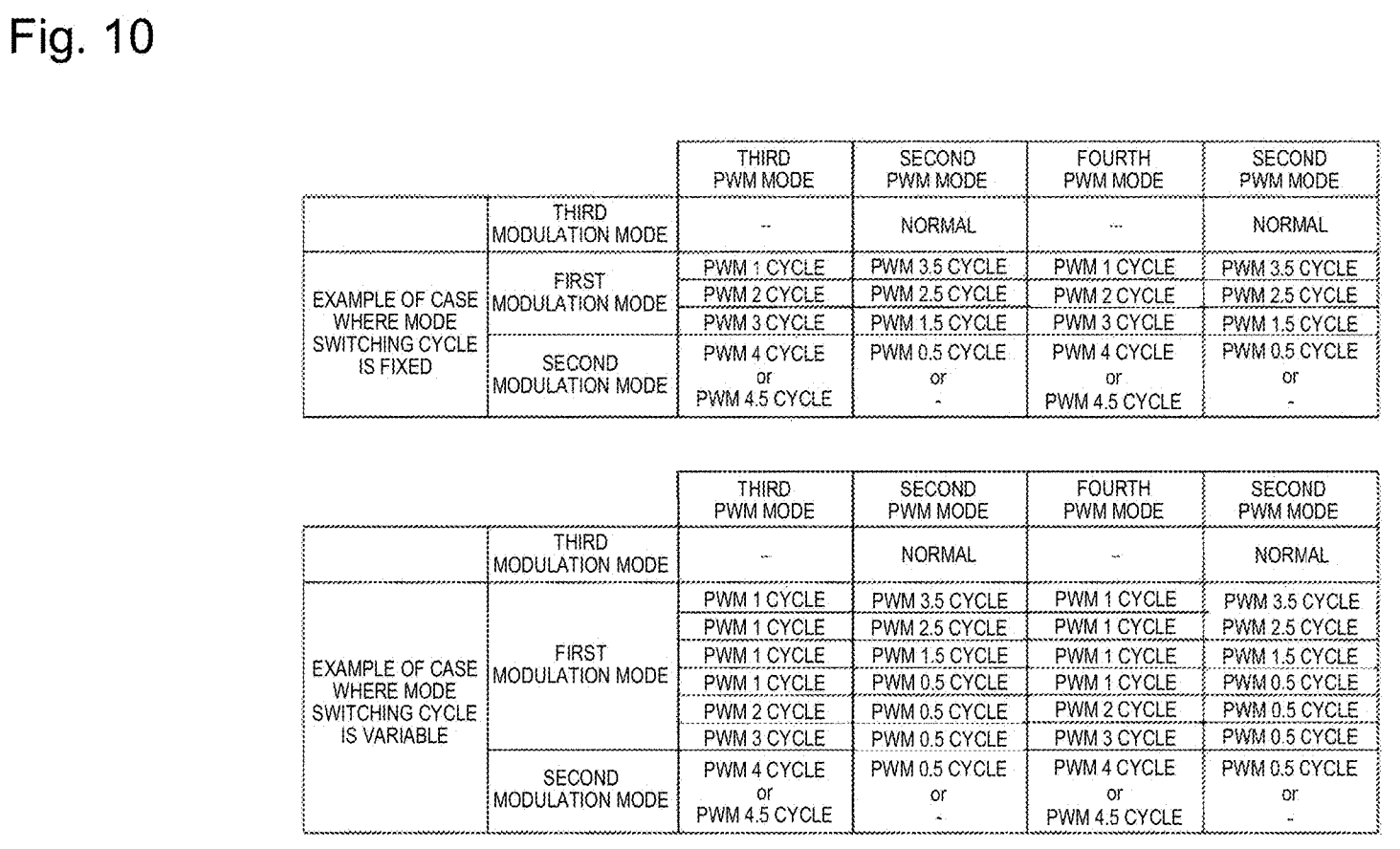

EXAMPLE OF CASE WHERE MODE SWITCHING CYCLE IS FIXED

| | | THIRD PWM MODE | SECOND PWM MODE | FOURTH PWM MODE | SECOND PWM MODE |
|---|---|---|---|---|---|
| | THIRD MODULATION MODE | - | NORMAL | ... | NORMAL |
| | FIRST MODULATION MODE | PWM 1 CYCLE / PWM 2 CYCLE / PWM 3 CYCLE | PWM 3.5 CYCLE / PWM 2.5 CYCLE / PWM 1.5 CYCLE / PWM 0.5 CYCLE | PWM 1 CYCLE / PWM 2 CYCLE / PWM 3 CYCLE | PWM 3.5 CYCLE / PWM 2.5 CYCLE / PWM 1.5 CYCLE / PWM 0.5 CYCLE |
| | SECOND MODULATION MODE | PWM 4 CYCLE or PWM 4.5 CYCLE | or - | PWM 4 CYCLE or PWM 4.5 CYCLE | or - |

EXAMPLE OF CASE WHERE MODE SWITCHING CYCLE IS VARIABLE

| | | THIRD PWM MODE | SECOND PWM MODE | FOURTH PWM MODE | SECOND PWM MODE |
|---|---|---|---|---|---|
| | THIRD MODULATION MODE | - | NORMAL | ... | NORMAL |
| | FIRST MODULATION MODE | PWM 1 CYCLE / PWM 1 CYCLE / PWM 1 CYCLE / PWM 1 CYCLE / PWM 2 CYCLE / PWM 3 CYCLE | PWM 3.5 CYCLE / PWM 2.5 CYCLE / PWM 1.5 CYCLE / PWM 0.5 CYCLE / PWM 0.5 CYCLE / PWM 0.5 CYCLE | PWM 1 CYCLE / PWM 1 CYCLE / PWM 1 CYCLE / PWM 1 CYCLE / PWM 2 CYCLE / PWM 3 CYCLE | PWM 3.5 CYCLE / PWM 2.5 CYCLE / PWM 1.5 CYCLE / PWM 0.5 CYCLE / PWM 0.5 CYCLE / PWM 0.5 CYCLE |
| | SECOND MODULATION MODE | PWM 4 CYCLE or PWM 4.5 CYCLE | PWM 0.5 CYCLE or - | PWM 4 CYCLE or PWM 4.5 CYCLE | PWM 0.5 CYCLE or - |

POWER CONVERSION DEVICE

CROSS-REFERENCE TO RELATED APPLICATIONS

This is the U.S. national stage of application No. PCT/JP2022/047775, filed on Dec. 23, 2022, and priority under 35 U.S.C. § 119(a) and 35 U.S.C. § 365(b) is claimed from Japanese Patent Application No. 2021-213237, filed on Dec. 27, 2021.

FIELD OF THE INVENTION

The present invention relates to a power conversion device.

BACKGROUND

Conventionally, there are known a two-phase modulation method in which a high-side switch or a low-side switch of one phase among six switches included in a power conversion circuit such as a three-phase inverter is fixed to be ON, and switches of the remaining phases are controlled by pulse width modulation, and a three-phase modulation method in which switches of all phases among six switches are controlled by pulse width modulation.

The two-phase modulation method has an advantage that a switching loss is low, but has a disadvantage that noise is large due to a large phase current ripple. The three-phase modulation method has an advantage that a phase current ripple is small (noise is small) and high-accuracy motor control with little torque unevenness can be realized, but has a disadvantage that a switching loss is large.

Conventionally, there is a technical idea of controlling a power conversion circuit while switching between a two-phase modulation method and a three-phase modulation method. However, when the two-phase modulation method and the three-phase modulation method are instantaneously switched, torque of a motor fluctuates due to a sudden change in a switching loss, and there is a possibility that the user feels uncomfortable due to a sudden change in noise.

Conventionally, a technique of reducing a sudden change in noise caused by switching from a three-phase modulation method to a two-phase modulation method by using the three-phase modulation method when a modulation rate is small and continuously changing the modulation method from the three-phase modulation method to a two-phase modulation method as the modulation rate increases is known.

In the conventional technique, a three-phase modulation method and a two-phase modulation method are alternately switched in a state where a sum of a pair of a three-phase modulation period and a two-phase modulation period adjacent to each other on a time axis is fixed to $\frac{1}{6}$ of one electrical angle cycle of an AC waveform appearing at a connection terminal of a power conversion circuit. In this case, the switching loss changes at the timing when the three-phase modulation method and the two-phase modulation method are switched, so that torque unevenness may occur.

SUMMARY

One aspect of an exemplary power conversion device of the present invention includes: a power conversion circuit that performs mutual conversion between DC power and N-phase AC power (N is an integer of 3 or more); and a control unit that controls 2N switches included in the power conversion circuit in a first modulation mode. In the first modulation mode, the control unit periodically switches between a first PWM mode in which a high-side switch or a low-side switch of one phase among the 2N switches is fixed to be turned on and switches of remaining phases are controlled by pulse width modulation and a second PWM mode in which switches of all phases among the 2N switches are controlled by the pulse width modulation. A sum of a first period in which the control unit operates in the first PWM mode and a second period in which the control unit operates in the second PWM mode is shorter than $\frac{1}{2}N$ of one electrical angle cycle of an AC waveform appearing at a connection terminal of the power conversion circuit. The first period has a length equal to or longer than one cycle of the pulse width modulation. A ratio of the first period to a sum of the first period and the second period is variable.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 1 is a circuit block diagram schematically illustrating a configuration of a power conversion device according to a first embodiment of the present invention;

FIG. 4 is a diagram illustrating magnitudes of phase current ripple illustrated in FIG. 3 as standard deviations of a current value;

FIG. 8 is a diagram illustrating an example of each high-side gate signal output during a period in which a control unit according to a fifth embodiment operates in each of the first modulation mode, the second modulation mode, and the third modulation mode;

FIG. 9 is a diagram illustrating a specific example of a mode ratio in the third embodiment; and FIG. 10 is a diagram illustrating a specific example of a mode ratio in the fifth embodiment.

DETAILED DESCRIPTION

Figure 2:
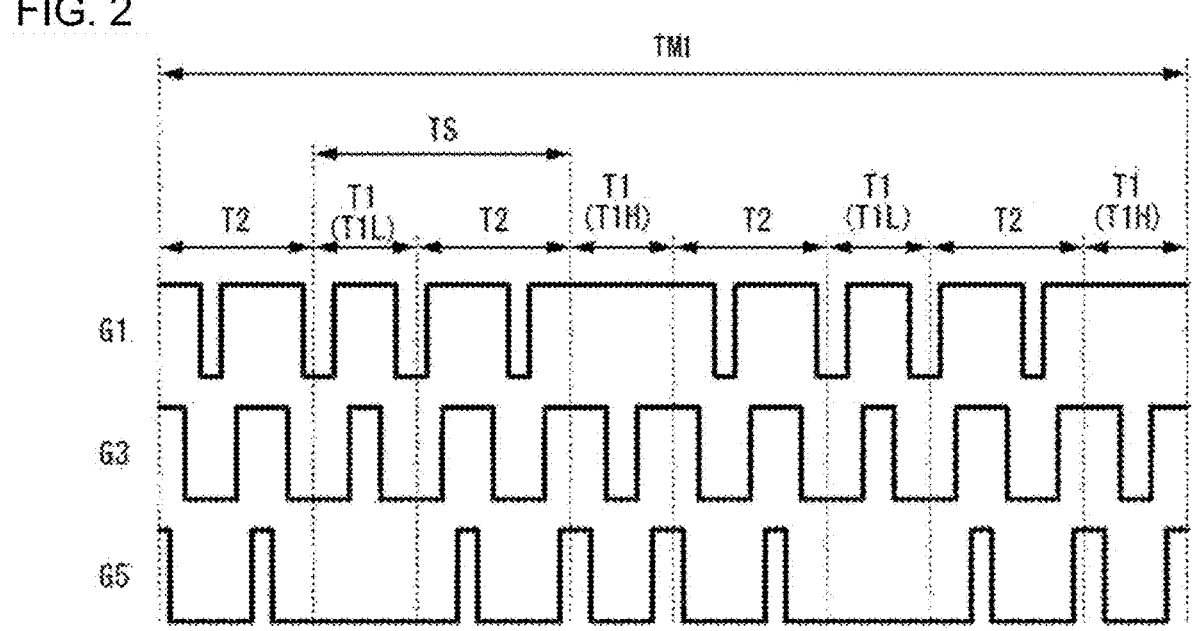
FIG. 2 is a diagram illustrating an example of each high-side gate signal output during a period in which a control unit according to the first embodiment operates in a first modulation mode.

An embodiment of the present invention will be described in detail below with reference to the drawings.

Figure 1:
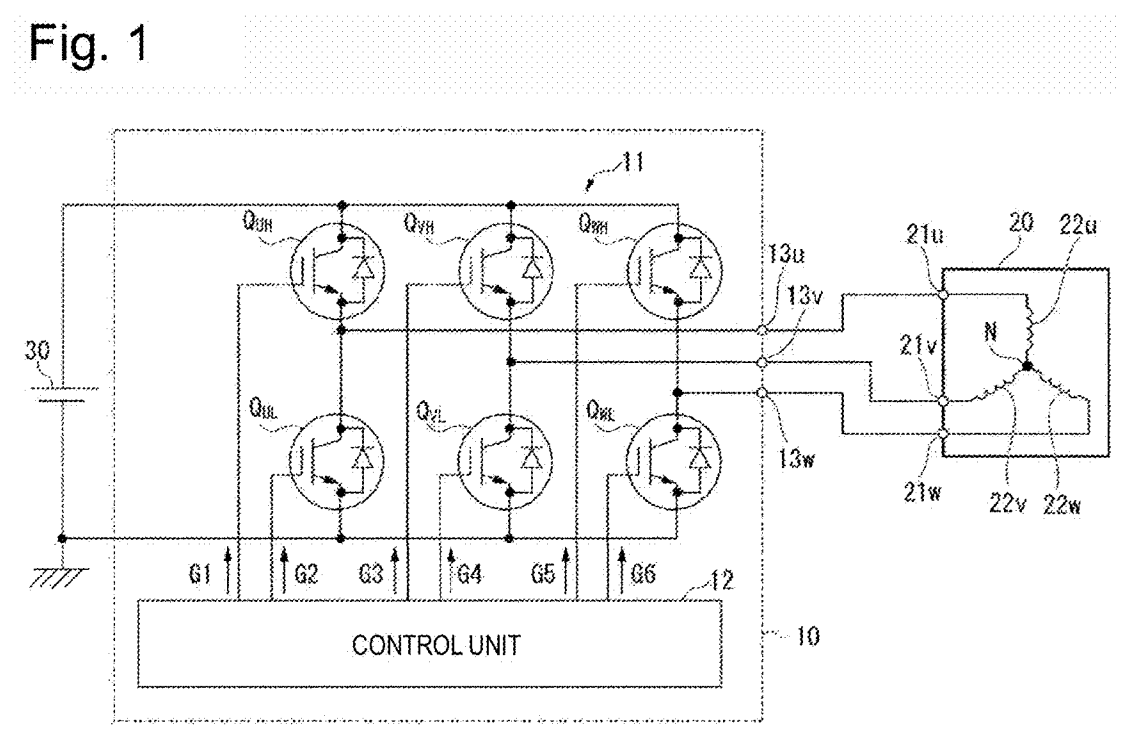

First, a first embodiment of the present invention will be described. FIG. 1 is a circuit block diagram schematically illustrating a configuration of a power conversion device 10 according to the first embodiment. As illustrated in FIG. 1, the power conversion device 10 is connected to a motor 20. As an example, the motor 20 is an inner rotor type three-phase brushless DC motor. Further, the motor 20 is, for example, a driving motor (traction motor) mounted on an electric vehicle.

The motor 20 includes a U-phase terminal 21$u$, a V-phase terminal 21$v$, a W-phase terminal 21$w$, a U-phase coil 22$u$, a V-phase coil 22$v$, and a W-phase coil 22$w$. Although not illustrated in FIG. 1, the motor 20 includes a motor case, and a rotor and a stator housed in the motor case. The rotor is a rotating body rotatably supported by a bearing component such as a rotor bearing inside the motor case. The rotor has an output shaft coaxially joined to the rotor in a state of axially penetrating the radially inner side of the rotor. The stator is fixed inside the motor case in a state of surrounding an outer peripheral surface of the rotor, and generates an electromagnetic force necessary for rotating the rotor.

The U-phase terminal 21$u$, the V-phase terminal 21$v$, and the W-phase terminal 21$w$ are metal terminals each exposed from a surface of the motor case. The U-phase terminal 21$u$ is connected to a U-phase connection terminal 13$u$ of the power conversion device 10. The V-phase terminal 21$v$ is connected to a V-phase connection terminal 13$v$ of the power conversion device 10. The W-phase terminal 21$w$ is connected to a W-phase connection terminal 13$w$ of the power conversion device 10. The U-phase coil 22$u$, the V-phase coil 22$v$, and the W-phase coil 22$w$ are excitation coils provided in the stator. As an example, the U-phase coil 22$u$, the V-phase coil 22$v$, and the W-phase coil 22$w$ are star-connected inside the motor 20.

The U-phase coil 22$u$ is connected between the U-phase terminal 21$u$ and a neutral point N. The V-phase coil 22$v$ is connected between the V-phase terminal 21$v$ and the neutral point N. The W-phase coil 22$w$ is electrically connected between the W-phase terminal 21$w$ and the neutral point N. When energization states of the U-phase coil 22$u$, the V-phase coil 22$v$, and the W-phase coil 22$w$ are controlled by the power conversion device 10, electromagnetic force necessary for rotating the rotor is generated. When the rotor rotates, an output shaft also rotates in synchronization with the rotor.

The power conversion device 10 includes a power conversion circuit 11 and a control unit 12. The power conversion circuit 11 is connected to the motor 20 and a DC power supply 30, and performs mutual conversion between DC power and N-phase AC power (N is an integer of three or more). In the present embodiment, since the motor 20 is a three-phase motor, a value of N is three. Therefore, the power conversion circuit 11 performs mutual conversion between DC power and three-phase AC power. For example, when the power conversion circuit 11 functions as an inverter, the power conversion circuit 11 converts DC power supplied from the DC power supply 30 into three-phase AC power and outputs the three-phase AC power to the motor 20. As an example, the DC power supply 30 is one of a plurality of batteries mounted on an electric vehicle.

The power conversion circuit 11 includes 2N switches. As described above, in the present embodiment, since a value of N is three, the power conversion circuit 11 includes six switches. The power conversion circuit 11 includes a U-phase high-side switch $Q_{UH}$, a V-phase high-side switch $Q_{VH}$, a W-phase high-side switch $Q_{WH}$, a U-phase low-side switch $Q_{UL}$, a V-phase low-side switch $Q_{VL}$, and a W-phase low-side switch $Q_{WL}$. In the present embodiment, each switch is, for example, an insulated gate bipolar transistor (IGBT).

Each of a collector terminal of the U-phase high-side switch $Q_{UH}$, a collector terminal of the V-phase high-side switch $Q_{VH}$, and a collector terminal of the W-phase high-side switch $Q_{WH}$ is connected to a positive electrode terminal of the DC power supply 30. Each of an emitter terminal of the U-phase low-side switch $Q_{UL}$, an emitter terminal of the V-phase low-side switch $Q_{VL}$, and an emitter terminal of the W-phase low-side switch $Q_{WL}$ is connected to a negative electrode terminal of the DC power supply 30.

An emitter terminal of the U-phase high-side switch $Q_{UH}$ is connected to each of the U-phase connection terminal 13$u$ and a collector terminal of the U-phase low-side switch $Q_{UL}$. That is, an emitter terminal of the U-phase high-side switch $Q_{UH}$ is connected to the U-phase terminal 21$u$ of the motor 20 via the U-phase connection terminal 13$u$. An emitter terminal of the V-phase high-side switch $Q_{VH}$ is connected to each of the V-phase connection terminal 13$v$ and a collector terminal of the V-phase low-side switch $Q_{VL}$. That is, an emitter terminal of the V-phase high-side switch $Q_{VH}$ is connected to the V-phase terminal 21$v$ of the motor 20 via the V-phase connection terminal 13$v$. An emitter terminal of the W-phase high-side switch $Q_{WH}$ is connected to each of the W-phase connection terminal 13$w$ and a collector terminal of the W-phase low-side switch $Q_{WL}$. That is, an emitter terminal of the W-phase high-side switch $Q_{WH}$ is connected to the W-phase terminal 21$w$ of the motor 20 via the W-phase connection terminal 13$w$.

A gate terminal of the U-phase high-side switch $Q_{UH}$, a gate terminal of the V-phase high-side switch $Q_{VH}$, and a gate terminal of the W-phase high-side switch $Q_{WH}$ are connected to the control unit 12. Further, a gate terminal of the U-phase low-side switch $Q_{UL}$, a gate terminal of the V-phase low-side switch $Q_{VL}$, and a gate terminal of the W-phase low-side switch $Q_{WL}$ are also connected to the control unit 12.

As described above, the power conversion circuit 11 includes a three-phase full-bridge circuit including three high-side switches and three low-side switches. The power conversion circuit 11 configured as described above performs mutual conversion between DC power and three-phase AC power as the control unit 12 performs switching control of each switch. The U-phase connection terminal 13$u$, the V-phase connection terminal 13$v$, and the W-phase connection terminal 13$w$ are connection terminals of the power conversion circuit 11.

The control unit 12 is a processor incorporating a memory (not illustrated). As an example, the control unit 12 is a microcontroller unit (MCU). The control unit 12 controls the power conversion circuit 11 according to a program stored in advance in the memory. Although details will be described later, the control unit 12 controls the six switches included in the power conversion circuit 11 in the first modulation mode. The control unit 12 generates a gate signal necessary for controlling the six switches in the first modulation mode.

The control unit 12 generates a U-phase high-side gate signal G1 necessary for controlling the U-phase high-side switch $Q_{UH}$, and outputs the generated U-phase high-side gate signal G1 to a gate terminal of the U-phase high-side switch $Q_{UH}$. The control unit 12 generates a U-phase low-side gate signal G2 necessary for controlling the U-phase low-side switch $Q_{UL}$, and outputs the generated U-phase low-side gate signal G2 to a gate terminal of the U-phase low-side switch $Q_{UL}$. The U-phase low-side gate signal G2 is a complementary signal of the U-phase high-side gate signal G1.

The control unit 12 generates a V-phase high-side gate signal G3 necessary for controlling the V-phase high-side switch $Q_{VH}$, and outputs the generated V-phase high-side gate signal G3 to a gate terminal of the V-phase high-side switch $Q_{VH}$. The control unit 12 generates a V-phase low-side gate signal G4 necessary for controlling the V-phase low-side switch $Q_{VL}$, and outputs the generated V-phase low-side gate signal G4 to a gate terminal of the V-phase low-side switch $Q_{VL}$. The V-phase low-side gate signal G4 is a complementary signal of the V-phase high-side gate signal G3.

The control unit 12 generates a W-phase high-side gate signal G5 necessary for controlling the W-phase high-side switch $Q_{WH}$, and outputs the generated W-phase high-side gate signal G5 to a gate terminal of the W-phase high-side switch $Q_{WH}$. The control unit 12 generates a W-phase low-side gate signal G6 necessary for controlling the W-phase low-side switch $Q_{WL}$, and outputs the generated W-phase low-side gate signal G6 to a gate terminal of the W-phase low-side switch $Q_{WL}$. The W-phase low-side gate signal G6 is a complementary signal of the W-phase high-side gate signal G5.

Note that dead time is inserted into each gate signal in order to prevent a high-side switch and a low-side switch of the same phase from being simultaneously switched on.

Hereinafter, operation of the control unit 12 included in the power conversion device 10 will be described in detail. The control unit 12 has a first modulation mode as the modulation mode. The control unit 12 controls the six switches included in the power conversion circuit 11 in the first modulation mode.

FIG. 2 is a diagram illustrating an example of the U-phase high-side gate signal G1, the V-phase high-side gate signal G3, and the W-phase high-side gate signal G5 output in a period TM1 in which the control unit 12 operates in the first modulation mode. Since each low-side gate signal is a complementary signal of each high-side gate signal, each low-side gate signal is not illustrated in FIG. 2. In the following description, the period TM1 in which the control unit 12 operates in the first modulation mode may be referred to as a first modulation mode period.

In the first modulation mode, the control unit 12 periodically switches between a first pulse width modulation (PWM) mode in which a high-side switch or a low-side switch of one phase among the six switches is fixed to be turned on and the switches of the remaining phases are controlled by pulse width modulation and a second PWM mode in which the switches of all phases among the six switches are controlled by pulse width modulation.

In FIG. 2, a first period T1 is a period in which the control unit 12 operates in the first PWM mode. In the following description, the first period T1 may be referred to as a first PWM mode period. The first PWM mode period T1 is divided into a high-side continuous ON period T1H and a low-side continuous ON period T1L. In the high-side continuous ON period T1H, the control unit 12 fixes the U-phase high-side switch QUE among the six switches to be turned on, and controls the remaining V-phase and W-phase switches by pulse width modulation. In the low-side continuous ON period T1L, the control unit 12 fixes the W-phase low-side switch $Q_{WL}$ among the six switches to be turned on, and controls the remaining U-phase and V-phase switches by pulse width modulation. The switches of the remaining phases include high-side switches and low-side switches of the remaining phases.

In FIG. 2, a second period T2 is a period in which the control unit 12 operates in the second PWM mode. In the following description, the second period T2 may be referred to as a second PWM mode period. In the second PWM mode period T2, the control unit 12 controls all phase switches among the six switches by pulse width modulation. The all-phase switches include all-phase high-side switches and all-phase low-side switches. The control unit 12 periodically switches between the first PWM mode and the second PWM mode in the first modulation mode period TM1. As a result, as illustrated in FIG. 2, in the first modulation mode period TM1, the first PWM mode period T1 and the second PWM mode period T2 alternately appear.

Hereinafter, a mode in which the control unit 12 fixes the high-side switch of one phase among the six switches to be turned on and controls the switches of the remaining phases by pulse width modulation is referred to as a third PWM mode. A mode in which the control unit 12 fixes the low-side switch of one phase among the six switches to be turned on and controls the switches of the remaining phases by pulse width modulation is referred to as a fourth PWM mode. The high-side continuous ON period T1H is a period in which the control unit 12 operates in the third PWM mode. The low-side continuous ON period T1L is a period in which the control unit 12 operates in the fourth PWM mode.

In the first modulation mode period TM1, the control unit 12 alternately switches the third PWM mode and the fourth PWM mode to the first PWM mode. As a result, as illustrated in FIG. 2, in the first modulation mode period TM1, the high-side continuous ON period T1H and the low-side continuous ON period T1L alternately appear with the second PWM mode period T2 interposed therebetween.

In the first PWM mode period T1, the on-period of each phase in one cycle of the pulse width modulation, that is, the duty of each phase, is a value uniformly offset from the duty when the second PWM mode is applied to the on-period of each phase. Specifically, in the case of the high-side continuous ON period T1H, the duties of all the phases are uniformly offset such that the phase having the maximum duty among the duties of the phases when the second PWM mode is applied to the high-side continuous ON period T1H has a duty of 100%. In the case of the low-side continuous ON period T1L, the duties of all the phases are uniformly offset such that the phase having the minimum duty among the duties of the phases when the second PWM mode is applied to the low-side continuous ON period T1L has a duty of 0%. As a result, the phase voltage in the first PWM mode period T1 and the phase voltage in the second PWM mode period T2 coincide with each other, and smooth motor control is realized.

The sum TS of the first PWM mode period T1 and the second PWM mode period T2 is shorter than ½N of one electrical angle cycle of the AC waveform appearing at the connection terminal of the power conversion circuit 11. As described above, in the present embodiment, since the value of N is 3, the sum TS of the first PWM mode period T1 and the second PWM mode period T2 is shorter than ⅙ of one electrical angle cycle. The sum TS of the first PWM mode period T1 and the second PWM mode period T2 is a sum of a pair of the first PWM mode period T1 and the second PWM mode period T2 adjacent to each other on the time axis. Hereinafter, the sum TS of the first PWM mode period T1 and the second PWM mode period T2 may be referred to as a mode switching cycle.

The first PWM mode period T1 has a length equal to or longer than one cycle of pulse width modulation. One cycle of pulse width modulation means one cycle of a PWM waveform (rectangular wave) appearing in each gate signal. The length of the second PWM mode period T2 is not particularly limited as long as the above condition "The mode switching cycle TS is shorter than ½N of one electrical angle cycle of the AC waveform appearing at the connection terminal of the power conversion circuit 11" is satisfied. As an example, in FIG. 2, the first PWM mode period T1 has a length corresponding to one cycle of pulse width modulation, and the second PWM mode period T2 has a length corresponding to 1.5 cycles of pulse width modulation. In this case, the mode switching cycle TS corresponds to 2.5 cycles of pulse width modulation. For example, in a case where one electrical angle cycle includes 90 cycles of pulse width modulation, ⅙ of one electrical angle cycle corresponds to 15 cycles of pulse width modulation, and the mode switching cycle TS of the present embodiment is a cycle sufficiently shorter than ⅙ of one electrical angle cycle.

The ratio of the first PWM mode period T1 to the sum of the first PWM mode period T1 and the second PWM mode period T2 is variable. In the following description, the ratio of the first PWM mode period T1 to the sum of the first PWM mode period T1 and the second PWM mode period T2 may be referred to as a mode ratio. When the first PWM mode period T1 becomes relatively longer than the second PWM mode period T2, the mode ratio increases. On the other hand, when the second PWM mode period T2 becomes relatively longer than the first PWM mode period T1, the mode ratio becomes smaller.

In a case where the control unit 12 operates in the first modulation mode in a state where the mode ratio is relatively large, the ratio of the period in which the switching of one phase is stopped in the first modulation mode period TM1 becomes large, and thus, the switching loss becomes relatively small. This corresponds to a state close to the characteristics of two-phase modulation. For this reason, the phase current ripple becomes relatively large. On the other hand, in a case where the control unit 12 operates in the first modulation mode in a state where the mode ratio is relatively small, the ratio of the period in which the switching of one phase is stopped in the first modulation mode period TM1 becomes small, and thus the switching loss becomes relatively large. This corresponds to a state close to the characteristics of three-phase modulation. For this reason, the phase current ripple becomes relatively small. As described above, the first modulation mode becomes closer to the characteristics of the two-phase modulation as the mode ratio increases. As the mode ratio decreases, the first modulation mode becomes closer to the characteristics of three-phase modulation.

As described above, in the first embodiment, the mode switching cycle TS, which is the sum of the first PWM mode period T1 and the second PWM mode period T2, is shorter than ⅙ of one electrical angle cycle of the AC waveform appearing at the connection terminal of the power conversion circuit 11. According to the first embodiment, the first PWM mode corresponding to the two-phase modulation and the second PWM mode corresponding to the three-phase modulation are switched at a high frequency as compared with the conventional technique. Consequently, the switching loss can be prevented from changing at the timing when the first PWM mode and the second PWM mode are switched, so that the torque unevenness can be prevented from being generated in the first modulation mode period TM1.

Further, according to the first embodiment, the average phase current ripple in the first modulation mode period TM1 can be reduced as compared with the case where each switch is controlled only by the two-phase modulation, so that noise can be reduced. Since the motor 20 is a kind of filter having an inductance component, it is possible to reduce the influence of the switching loss and the change in the phase current ripple due to the mode switching by increasing the speed of switching between the first PWM mode and the second PWM mode.

Figure 3:
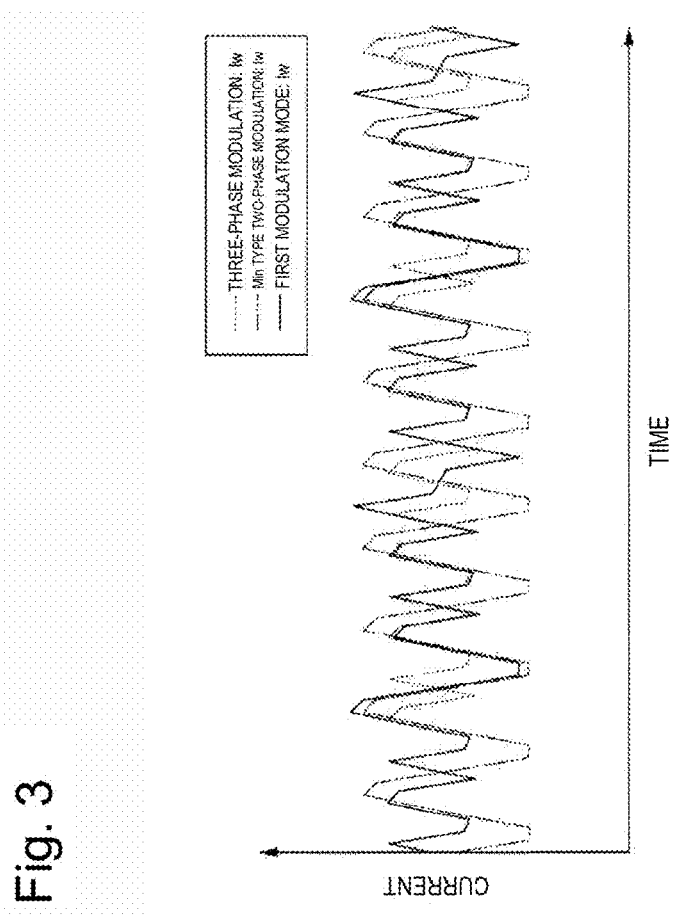
FIG. 3 is a diagram illustrating a phase current waveform obtained by performing a simulation assuming that each switch is controlled in the first modulation mode using the gate signal illustrated in FIG. 2.

FIG. 3 is a diagram illustrating a phase current waveform obtained by performing a simulation assuming that each switch is controlled in the first modulation mode using the gate signal illustrated in FIG. 2. In order to focus only on the phase current ripple while ignoring the current fluctuation accompanying the rotation of the motor 20, simulation has been performed under a condition where the rotation angle of the motor 20 is fixed to a predetermined value. For comparison, FIG. 3 illustrates a phase current waveform obtained by performing a simulation assuming that each switch is controlled only by three-phase modulation and a phase current waveform obtained by performing a simulation assuming that each switch is controlled only by Min type two-phase modulation. The Min type two-phase modulation means so-called low-side-on-fixed-type two-phase modulation. The low-side-on-fixed-type two-phase modulation is a two-phase modulation method in which, among six switches, a low-side switch of one phase is fixed to be turned on, and the switches of the remaining phases are controlled by pulse width modulation. In the low-side-on-fixed-type two-phase modulation, a phase switching cycle in which a low-side switch is set to be turned on corresponds to ⅓ of one electrical angle cycle. Each phase current waveform is a waveform of the W-phase current Iw.

Figure 4:
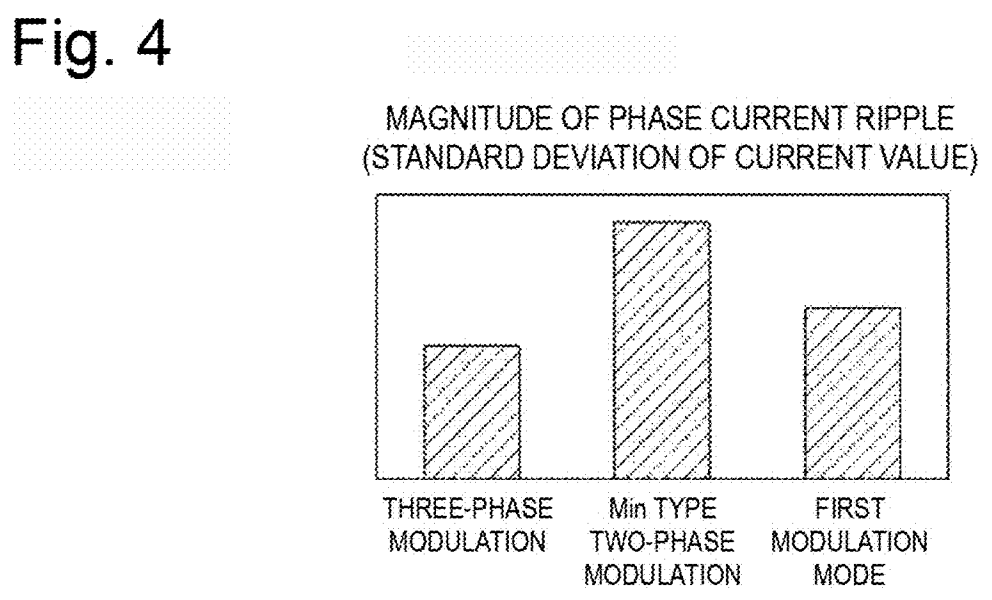

FIG. 4 is a diagram illustrating the magnitude of the phase current ripple illustrated in FIG. 3 as the standard deviation of the current value. As illustrated in FIG. 4, according to the first embodiment, it can be seen that the average phase current ripple can be reduced as compared with the case where each switch is controlled only by the Min type two-phase modulation. As in the example of the gate signal illustrated in FIG. 2, in a case where the first PWM mode period T1 has a length corresponding to one cycle of pulse width modulation, and the second PWM mode period T2 has a length corresponding to 1.5 cycles of pulse width modulation, the switching frequency in the first modulation mode period TM1 is 13/15 as compared with a case where each switch is controlled only by three-phase modulation. Therefore, according to the first embodiment, switching loss can be reduced as compared with a case where each switch is controlled only by three-phase modulation.

According to the first embodiment, for example, when the state of the first modulation mode is switched from a state close to the characteristic of the two-phase modulation (state in which the mode ratio is relatively large) to a state close to the characteristic of the three-phase modulation (state in which the mode ratio is relatively small), the shift from the state close to the characteristic of the two-phase modulation to the state close to the characteristic of the three-phase modulation gradually proceeds by gradually changing the mode ratio from a large value to a small value. As a result, it is possible to reduce a sudden change in noise caused by switching from a state close to the characteristic of the two-phase modulation to a state close to the characteristic of the three-phase modulation, and thus, it is possible to suppress giving discomfort to the user.

Similarly, when the state of the first modulation mode is switched from a state close to the characteristic of the three-phase modulation to a state close to the characteristic of the two-phase modulation, the shift from the state close to the characteristic of the three-phase modulation to the state close to the characteristic of the two-phase modulation gradually proceeds by gradually changing the mode ratio from a small value to a large value. As a result, it is possible to reduce a sudden change in noise caused by switching from a state close to the characteristic of the three-phase modulation to a state close to the characteristic of the two-phase modulation, and thus, it is possible to suppress giving discomfort to the user.

In the first embodiment, the control unit 12 alternately switches the third PWM mode and the fourth PWM mode to the first PWM mode in the first modulation mode period TM1. As a result, in the first modulation mode period TM1, the high-side continuous ON period T1H and the low-side continuous ON period T1L alternately appear as the first PWM mode period T1. As a result, the switching loss in the high-side continuous ON period T1H and the switching loss in the low-side continuous ON period T1L are averaged over the entire period of the first modulation mode period TM1. As a result, the calorific value in the high-side continuous ON period T1H and the calorific value in the low-side continuous ON period T1 are balanced, so that overheating of the power conversion circuit 11 in the first modulation mode period TM1 can be suppressed.

In the first embodiment, the high-side continuous ON period T1H in which the control unit 12 operates in the third PWM mode coincides with the low-side continuous ON period T1L in which the control unit 12 operates in the fourth PWM mode. In the example illustrated in FIG. 2, both the high-side continuous ON period T1H and the low-side continuous ON period T1L have a length corresponding to one cycle of pulse width modulation.

As a result, the balance between the calorific value in the high-side continuous ON period T1H and the calorific value in the low-side continuous ON period T1L is improved, so that overheating of the power conversion circuit 11 in the first modulation mode period TM1 can be more effectively suppressed.

In the first embodiment, the mode in which the control unit 12 alternately switches the third PWM mode and the fourth PWM mode as the first PWM mode in the first modulation mode period TM1 is exemplified, but the present invention is not limited thereto.

For example, the control unit 12 may control each switch using only the third PWM mode as the first PWM mode in the first modulation mode period TM1. In this case, all the first PWM mode periods T1 included in the first modulation mode period TM1 become the high-side continuous ON period T1H. Furthermore, for example, the control unit 12 may control each switch using only the fourth PWM mode as the first PWM mode in the first modulation mode period TM1. In this case, all the first PWM mode periods T1 included in the first modulation mode period TM1 become the low-side continuous ON period T1L.

Furthermore, in the first PWM mode period T1, the control unit 12 may switch between the third PWM mode and the fourth PWM mode in a cycle shorter than ½N of one electrical angle cycle of the AC waveform appearing at the connection terminal of the power conversion circuit 11. For example, when the value of N is 3, the control unit 12 may switch between the third PWM mode and the fourth PWM mode in a cycle shorter than ⅙ of one electrical angle cycle in the first PWM mode period T1. In this case, in each of the first PWM mode periods T1 included in the first modulation mode period TM1, the high-side continuous ON period T1H and the low-side continuous ON period T1L alternately appear. Accordingly, in the first PWM mode period T1, the switching loss in the high-side continuous ON period T1H and the switching loss in the low-side continuous ON period T1L are averaged. As a result, the calorific value in the high-side continuous ON period T1H and the calorific value in the low-side continuous ON period T1 are balanced, so that overheating of the power conversion circuit 11 in the first PWM mode period T1 can be suppressed.

As described above, in a case where the control unit 12 switches between the third PWM mode and the fourth PWM mode in the first PWM mode period T1, the high-side continuous ON period T1H in which the control unit 12 operates in the third PWM mode and the low-side continuous ON period T1L in which the control unit 12 operates in the fourth PWM mode may coincide with each other in the first PWM mode period T1.

As a result, the balance between the calorific value in the high-side continuous ON period T1H and the calorific value in the low-side continuous ON period T1L is improved, so that overheating of the power conversion circuit 11 in the first PWM mode period T1 can be more effectively suppressed.

Next, a second embodiment of the present invention will be described. The second embodiment is different from the first embodiment in that the control unit 12 has not only the first modulation mode but also the second modulation mode and the third modulation mode as modulation modes. Therefore, operation of the control unit 12 in the second embodiment will be described in detail below.

In the second embodiment, when switching the modulation mode between the second modulation mode in which the mode ratio is a first ratio and the third modulation mode in which the mode ratio is a second ratio smaller than the first ratio, the control unit 12 operates in the first modulation mode in a period between a period of the operation in the second modulation mode and a period of the operation in the third modulation mode, and continuously or stepwise changes the mode ratio in a period of the operation in the first modulation mode.

Figure 5:
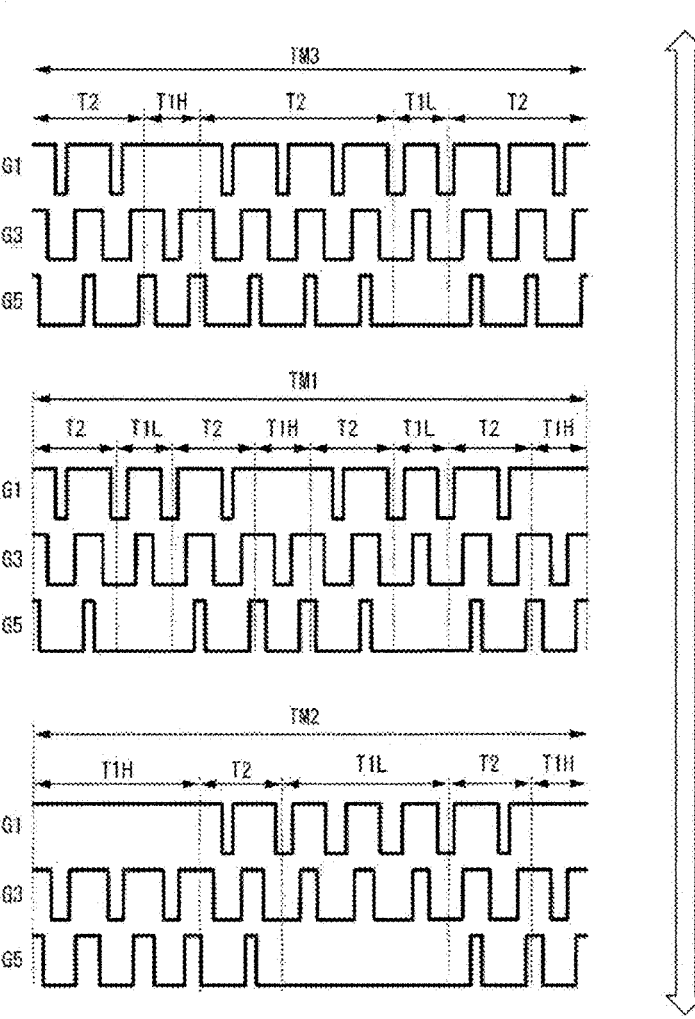
FIG. 5 is a diagram illustrating an example of each high-side gate signal output during a period in which a control unit according to a second embodiment operates in each of a first modulation mode, a second modulation mode, and a third modulation mode.

FIG. 5 is a diagram illustrating an example of the U-phase high-side gate signal G1, the V-phase high-side gate signal G3, and the W-phase high-side gate signal G5 output during a period in which the control unit 12 according to the second embodiment operates in each of the first modulation mode, the second modulation mode, and the third modulation mode. In FIG. 5, a period TM2 is a period in which the control unit 12 operates in the second modulation mode, and a period TM3 is a period in which the control unit 12 operates in the third modulation mode. In the following description, the period TM2 in which the control unit 12 operates in the second modulation mode may be referred to as a second modulation mode period, and a period TM3 in which the control unit 12 operates in the third modulation mode may be referred to as a third modulation mode period.

The second modulation mode is different from the first modulation mode in that the mode ratio is fixed at the first ratio larger than the mode ratio of the first modulation mode, and otherwise coincides with the first modulation mode. That is, in the second modulation mode, the control unit 12 periodically switches between the first PWM mode and the second PWM mode in a state where the mode ratio is fixed to the first ratio.

In the example illustrated in FIG. 5, the control unit 12 alternately switches the third PWM mode and the fourth PWM mode to the first PWM mode in the second modulation mode period TM2. As a result, as illustrated in FIG. 5, in the second modulation mode period TM2, the high-side continuous ON period T1H and the low-side continuous ON period T1L alternately appear as the first PWM mode period T1 with the second PWM mode period T2 interposed therebetween.

As an example, in FIG. 5, in the second modulation mode period TM2, the first PWM mode period T1 has a length corresponding to three cycles of pulse width modulation, and the second PWM mode period T2 has a length corresponding to 1.5 cycles of pulse width modulation. That is, in the example illustrated in FIG. 5, the mode ratio of the second modulation mode is fixed to 3/4.5. Hereinafter, the mode ratio of the second modulation mode may be referred to as a second mode ratio Rm2.

The third modulation mode is different from the first modulation mode and the second modulation mode in that the mode ratio is fixed to the second ratio smaller than the mode ratios of the first modulation mode and the second modulation mode, and is identical to the first modulation mode and the second modulation mode in other points. That is, in the third modulation mode, the control unit 12 periodically switches between the first PWM mode and the second PWM mode in a state where the mode ratio is fixed to the second ratio.

In the example illustrated in FIG. 5, the control unit 12 alternately switches the third PWM mode and the fourth PWM mode to the first PWM mode in the third modulation mode period TM3. As a result, as illustrated in FIG. 5, in the third modulation mode period TM3, the high-side continuous ON period T1H and the low-side continuous ON period T1L alternately appear as the first PWM mode period T1 with the second PWM mode period T2 interposed therebetween.

As an example, in FIG. 5, in the third modulation mode period TM3, the first PWM mode period T1 has a length corresponding to one cycle of pulse width modulation, and the second PWM mode period T2 has a length corresponding to 3.5 cycles of pulse width modulation. That is, in the example illustrated in FIG. 5, the mode ratio of the third modulation mode is fixed to 1/4.5. Hereinafter, the mode ratio of the third modulation mode may be referred to as a third mode ratio Rm3.

In the example illustrated in FIG. 5, similarly to the first embodiment, the control unit 12 alternately switches the third PWM mode and the fourth PWM mode to the first PWM mode in the first modulation mode period TM1. As a result, as illustrated in FIG. 5, in the first modulation mode period TM1, the high-side continuous ON period T1H and the low-side continuous ON period T1L alternately appear as the first PWM mode period T1 with the second PWM mode period T2 interposed therebetween.

As an example, in FIG. 5, in the first modulation mode period TM1, the first PWM mode period T1 has a length corresponding to one cycle of pulse width modulation, and the second PWM mode period T2 has a length corresponding to 1.5 cycles of pulse width modulation. That is, in the example illustrated in FIG. 5, the mode ratio of the first modulation mode is 1/2.5, but in the second embodiment, the control unit 12 changes the mode ratio continuously or stepwise in the first modulation mode period TM1. Hereinafter, the mode ratio of the first modulation mode may be referred to as a first mode ratio Rm1.

Assuming that the maximum value of the first mode ratio Rm1 is Rm1_max and the minimum value of the first mode ratio Rm1 is Rm1_min, the control unit 12 continuously or stepwise changes the first mode ratio Rm1 within a range represented by the following Expression (1) in the first modulation mode period TM1.

$$Rm1\_\min \leq Rm1 \leq Rm1\_\max \qquad (1)$$

The relationship between the first mode ratio Rm1 and the second mode ratio Rm2 is expressed by the following Expression (2). The relationship between the first mode ratio Rm1 and the third mode ratio Rm3 is expressed by the following Expression (3). The relationship between the second mode ratio Rm2 and the third mode ratio Rm3 is expressed by the following Expression (4).

$$Rm2 > Rm1\_\max \qquad (2)$$

$$Rm1\_\min > Rm3 \qquad (3)$$

$$Rm2 > Rm3 \qquad (4)$$

As described above, the second mode ratio Rm2 is the largest among the first mode ratio Rm1, the second mode ratio Rm2, and the third mode ratio Rm3. Among the first mode ratio Rm1, the second mode ratio Rm2, and the third mode ratio Rm3, the third mode ratio Rm3 is the smallest. Therefore, since the control unit 12 controls each switch in a state close to the characteristic of the two-phase modulation in the second modulation mode period TM2 in which the control unit 12 operates in the second modulation mode, the switching loss becomes relatively small, but the phase current ripple becomes relatively large. On the other hand, since the control unit 12 controls each switch in a state close to the characteristic of the three-phase modulation in the third modulation mode period TM3 in which the control unit 12 operates in the third modulation mode, the phase current ripple becomes relatively small, but the switching loss becomes relatively large.

If the second modulation mode and the third modulation mode are instantaneously switched, a torque fluctuation may occur due to a sudden change in switching loss, and the user may feel uncomfortable due to a sudden change in noise. However, in the second embodiment, when switching the modulation mode between the second modulation mode and the third modulation mode, the control unit 12 operates in the first modulation mode in the period between the second modulation mode period TM2 and the third modulation mode period TM3, and continuously or stepwise changes the first mode ratio Rm1 in the first modulation mode period TM1 within the range represented by the above Expression (1).

For example, in a case where the modulation mode is switched from the third modulation mode to the second modulation mode, the control unit 12 first operates in the third modulation mode in a state where the third mode ratio Rm3 is fixed at 1/4.5, and then shifts to the first modulation mode. When shifting to the first modulation mode, the control unit 12 operates in the first modulation mode while changing the first mode ratio Rm1 in the order of 1/3.5 (Rm1_min)→1/2.5→2/3.5 (Rm1_max) in the first modulation mode period TM1, and then shifts to the second modulation mode. When shifting to the second modulation mode, the control unit 12 operates in the second modulation mode in a state where the second mode ratio Rm2 is fixed to 3/4.5.

For example, in a case where the modulation mode is switched from the second modulation mode to the third modulation mode, the control unit 12 first operates in the second modulation mode in a state where the second mode ratio Rm2 is fixed at 3/4.5, and then shifts to the first modulation mode. When shifting to the first modulation mode, the control unit 12 operates in the first modulation mode while changing the first mode ratio Rm1 in the order of 2/3.5 (Rm1_max)→1/2.5→1/3.5 (Rm1_min) in the first modulation mode period TM1, and then shifts to the third modulation mode. When shifting to the third modulation mode, the control unit 12 operates in the third modulation mode in a state where the third mode ratio Rm3 is fixed at 1/4.5.

As described above, according to the second embodiment, when the control unit 12 switches the modulation mode between the second modulation mode and the third modulation mode, the shift of the modulation mode gradually proceeds between the second modulation mode close to the characteristic of the two-phase modulation and the third modulation mode close to the characteristic of the three-phase modulation by continuously or stepwise changing the first mode ratio Rm1 in the first modulation mode period TM1 between the second modulation mode period TM2 and the third modulation mode period TM3. Further, since it is possible to suppress a sudden change in switching loss and a sudden change in noise due to switching of the modulation mode, it is possible to reduce a torque fluctuation of the motor 20 and to prevent the user from feeling uncomfortable.

In the second modulation mode period TM2, the control unit 12 alternately switches the third PWM mode and the fourth PWM mode as the first PWM mode. As a result, in the second modulation mode period TM2, the high-side continuous ON period T1H and the low-side continuous ON period T1L alternately appear as the first PWM mode period T1.

As a result, the switching loss in the high-side continuous ON period T1H and the switching loss in the low-side continuous ON period T1L are averaged over the entire period of the second modulation mode period TM2. As a result, the calorific value in the high-side continuous ON period T1H and the calorific value in the low-side continuous ON period T1 are balanced, so that overheating of the power conversion circuit 11 in the second modulation mode period TM2 can be suppressed. The same applies to the third modulation mode period TM3.

In the second modulation mode period TM2, the high-side continuous ON period T1H in which the control unit 12 operates in the third PWM mode coincides with the low-side continuous ON period T1L in which the control unit 12 operates in the fourth PWM mode. In the example illustrated in FIG. 5, in the second modulation mode period TM2, both the high-side continuous ON period T1H and the low-side continuous ON period T1L have a length corresponding to three cycles of pulse width modulation.

As a result, the balance between the calorific value in the high-side continuous ON period T1H and the calorific value in the low-side continuous ON period T1L is improved, so that overheating of the power conversion circuit 11 in the second modulation mode period TM2 can be more effectively suppressed. The same applies to the third modulation mode period TM3.

In the second embodiment, the mode in which the control unit 12 alternately switches the third PWM mode and the fourth PWM mode as the first PWM mode in the second modulation mode period TM2 and the third modulation mode period TM3 is exemplified, but the present invention is not limited thereto. For example, the control unit 12 may control each switch using only the third PWM mode as the first PWM mode in at least one of the second modulation mode period TM2 and the third modulation mode period TM3. Furthermore, for example, the control unit 12 may control each switch using only the fourth PWM mode as the first PWM mode in at least one of the second modulation mode period TM2 and the third modulation mode period TM3.

Furthermore, in the second modulation mode period TM2, the control unit 12 may switch between the third PWM mode and the fourth PWM mode in a cycle shorter than ½N of one electrical angle cycle of the AC waveform appearing at the connection terminal of the power conversion circuit 11. For example, when the value of N is 3, the control unit 12 may switch between the third PWM mode and the fourth PWM mode in a cycle shorter than ⅙ of one electrical angle cycle in the second modulation mode period TM2.

Accordingly, in the second modulation mode period TM2, the switching loss in the high-side continuous ON period T1H and the switching loss in the low-side continuous ON period T1L are averaged. As a result, the calorific value in the high-side continuous ON period T1H and the calorific value in the low-side continuous ON period T1 are balanced, so that overheating of the power conversion circuit 11 in the second modulation mode period TM2 can be suppressed.

As described above, in a case where the control unit 12 switches between the third PWM mode and the fourth PWM mode in the second modulation mode period TM2, the high-side continuous ON period T1H in which the control unit 12 operates in the third PWM mode and the low-side continuous ON period T1L in which the control unit 12 operates in the fourth PWM mode may coincide with each other.

As a result, the balance between the calorific value in the high-side continuous ON period T1H and the calorific value in the low-side continuous ON period T1L is improved, so that overheating of the power conversion circuit 11 in the second modulation mode period TM2 can be more effectively suppressed.

Next, a third embodiment of the present invention will be described. The third embodiment is different from the second embodiment in that the second mode ratio Rm2 (first ratio in the second modulation mode) is 1 and the third mode ratio Rm3 (second ratio in the third modulation mode) is 0.

Figure 6:
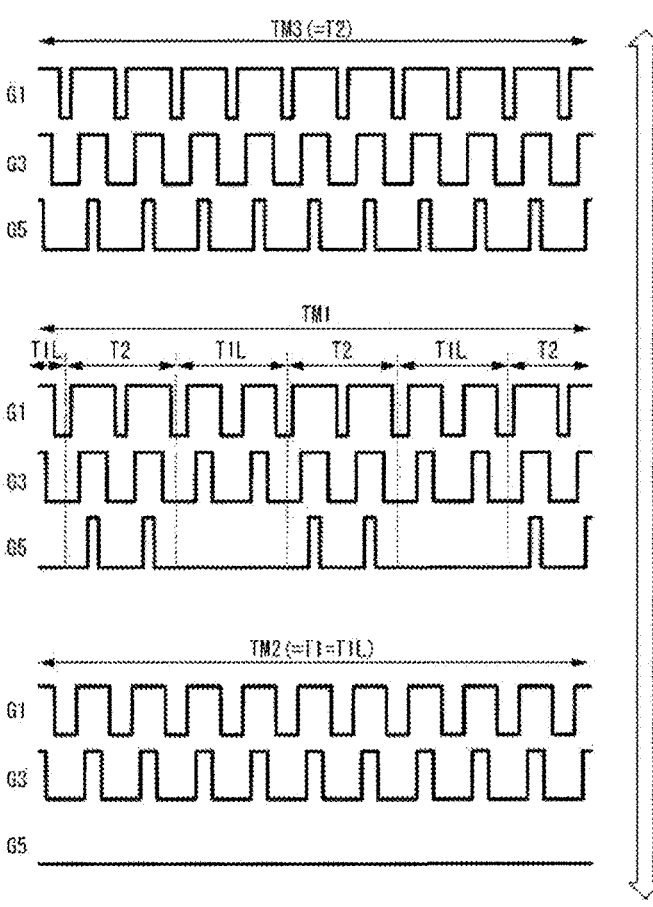
FIG. 6 is a diagram illustrating an example of each high-side gate signal output during a period in which a control unit according to a third embodiment operates in each of the first modulation mode, the second modulation mode, and the third modulation mode.

FIG. 6 is a diagram illustrating an example of a U-phase high-side gate signal G1, a V-phase high-side gate signal G3, and a W-phase high-side gate signal G5 output during a period in which the control unit 12 according to the third embodiment operates in each of the first modulation mode, the second modulation mode, and the third modulation mode.

As illustrated in FIG. 6, in a case where the second mode ratio Rm2 is 1, the control unit 12 operates only in the first PWM mode corresponding to the two-phase modulation over the entire period of the second modulation mode period TM2. That is, the second modulation mode period TM2 is equal to the first PWM mode period T1. In the example illustrated in FIG. 6, the control unit 12 operates in the fourth PWM mode as the first PWM mode in the second modulation mode period TM2. That is, the second modulation mode period TM2 is equal to the low-side continuous ON period T1L.

As illustrated in FIG. 6, in a case where the third mode ratio Rm3 is 0, the control unit 12 operates only in the second PWM mode corresponding to the three-phase modulation over the entire period of the third modulation mode period TM3. That is, the third modulation mode period TM3 is equal to the second PWM mode period T2.

In the example illustrated in FIG. 6, the control unit 12 uses only the fourth PWM mode as the first PWM mode in the first modulation mode period TM1. As a result, as illustrated in FIG. 6, in the first modulation mode period TM1, only the low-side continuous ON period T1L appears as the first PWM mode period T1. As in the second embodiment, in the first modulation mode period TM1, the control unit 12 continuously or stepwise changes the first mode ratio Rm1 within the range represented by the above Expression (1).

As described above, according to the third embodiment, since the control unit 12 operates only in the first PWM mode corresponding to the two-phase modulation over the entire period of the second modulation mode period TM2, the switching loss in the second modulation mode period TM2 can be reduced as compared with the second embodiment. Further, according to the third embodiment, since the control unit 12 operates only in the second PWM mode corresponding to the three-phase modulation over the entire period of the third modulation mode period TM3, it is possible to reduce the phase current ripple in the third modulation mode period TM3 as compared with the second embodiment.

Further, according to the third embodiment, similarly to the second embodiment, the control unit 12 continuously or stepwise changes the first mode ratio Rm1 in the first modulation mode period TM1 between the second modulation mode period TM2 and the third modulation mode period TM3, so that the shift of the modulation mode gradually proceeds between the second modulation mode corresponding to the two-phase modulation and the third modulation mode corresponding to the three-phase modulation. Further, since it is possible to suppress a sudden change in switching loss and a sudden change in noise due to switching of the modulation mode, it is possible to reduce a torque fluctuation of the motor 20 and to prevent the user from feeling uncomfortable.

Although FIG. 6 illustrates the case where the control unit 12 operates in the fourth PWM mode as the first PWM mode in the second modulation mode period TM2, the control unit 12 may operate in the third PWM mode in the second modulation mode period TM2.

Next, a fourth embodiment of the present invention will be described. The fourth embodiment is identical to the third embodiment in that the second mode ratio Rm2 is 1 and the third mode ratio Rm3 is 0, but is different from the third embodiment in that the control unit 12 alternately switches the third PWM mode and the fourth PWM mode in the second modulation mode period TM2 at a cycle corresponding to ⅙ of one electrical angle cycle of the AC waveform appearing at the connection terminal of the power conversion circuit 11.

Figure 7:
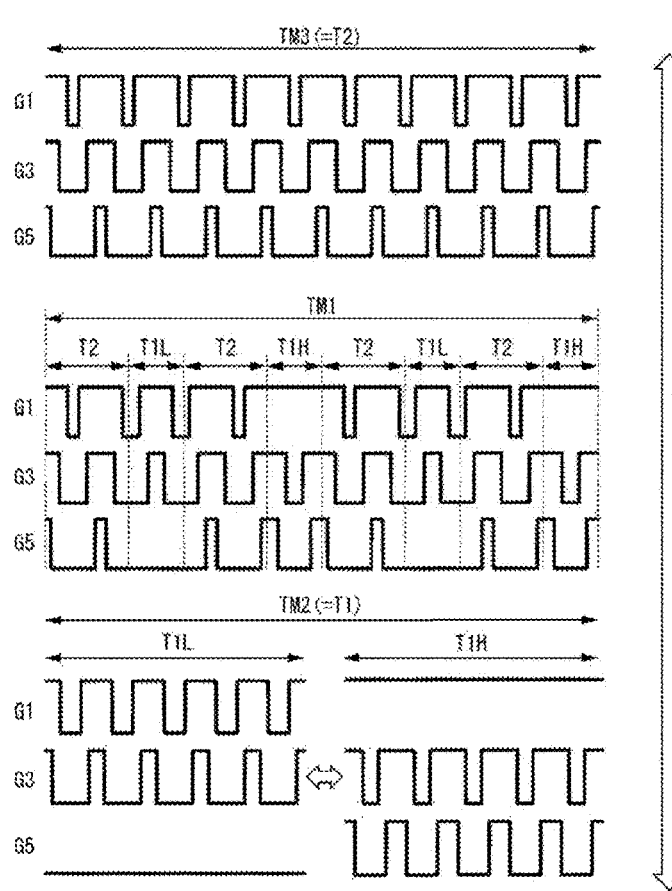
FIG. 7 is a diagram illustrating an example of each high-side gate signal output during a period in which a control unit according to a fourth embodiment operates in each of the first modulation mode, the second modulation mode, and the third modulation mode.

FIG. 7 is a diagram illustrating an example of a U-phase high-side gate signal G1, a V-phase high-side gate signal G3, and a W-phase high-side gate signal G5 output during a period in which the control unit 12 according to the fourth embodiment operates in each of the first modulation mode, the second modulation mode, and the third modulation mode.

As illustrated in FIG. 7, in a case where the second mode ratio Rm2 is 1, the control unit 12 operates only in the first PWM mode corresponding to the two-phase modulation over the entire period of the second modulation mode period TM2. That is, the second modulation mode period TM2 is equal to the first PWM mode period T1. In the example illustrated in FIG. 7, the control unit 12 alternately switches the third PWM mode and the fourth PWM mode in a cycle corresponding to ⅙ of one electrical angle cycle in the second modulation mode period TM2. That is, in the second modulation mode period TM2, the high-side continuous ON period T1H and the low-side continuous ON period T1L alternately appear in a cycle corresponding to ⅙ of one electrical angle cycle.

As illustrated in FIG. 7, in a case where the third mode ratio Rm3 is 0, the control unit 12 operates only in the second PWM mode corresponding to the three-phase modulation over the entire period of the third modulation mode period TM3. That is, the third modulation mode period TM3 is equal to the second PWM mode period T2.

In the example illustrated in FIG. 7, the control unit 12 alternately switches the third PWM mode and the fourth PWM mode to the first PWM mode in the first modulation mode period TM1. As a result, as illustrated in FIG. 7, in the first modulation mode period TM1, the high-side continuous ON period T1H and the low-side continuous ON period T1L alternately appear as the first PWM mode period T1 with the second PWM mode period T2 interposed therebetween. As in the third embodiment, in the first modulation mode period TM1, the control unit 12 continuously or stepwise changes the first mode ratio Rm1 within the range represented by the above Expression (1).

At the time of shifting from the first modulation mode to the second modulation mode, in the angular section in which the third PWM mode is applied as the second modulation mode, the control unit 12 decreases the ratio between the low-side continuous ON period T1L and the second PWM mode period T2 and increases the ratio of the high-side continuous ON period T1H. In addition, when shifting from the first modulation mode to the second modulation mode, in the angular section in which the fourth PWM mode is applied as the second modulation mode, the control unit 12 decreases the ratio between the high-side continuous ON period T1H and the second PWM mode period T2 and increases the ratio of the low-side continuous ON period T1L.

As described above, according to the fourth embodiment, the control unit 12 alternately switches the third PWM mode and the fourth PWM mode in the second modulation mode period TM2 at a cycle corresponding to ⅙ of one electrical angle cycle, whereby the high-side continuous ON period T1H and the low-side continuous ON period T1L alternately appear in the second modulation mode period TM2 at a cycle corresponding to ⅙ of one electrical angle cycle.

As a result, the balance between the calorific value in the high-side continuous ON period T1H and the calorific value in the low-side continuous ON period T1 is improved over the entire period of the second modulation mode period TM2, so that overheating of the power conversion circuit 11 in the second modulation mode period TM2 can be effectively suppressed.

Further, according to the fourth embodiment, similarly to the third embodiment, the control unit 12 continuously or stepwise changes the first mode ratio Rm1 in the first modulation mode period TM1 between the second modulation mode period TM2 and the third modulation mode period TM3, so that the shift of the modulation mode gradually proceeds between the second modulation mode corresponding to the two-phase modulation and the third modulation mode corresponding to the three-phase modulation. Further, since it is possible to suppress a sudden change in switching loss and a sudden change in noise due to switching of the modulation mode, it is possible to reduce a torque fluctuation of the motor 20 and to prevent the user from feeling uncomfortable.

Next, a fifth embodiment of the present invention will be described. The fifth embodiment is identical to the fourth embodiment in that the second mode ratio Rm2 is 1 and the third mode ratio Rm3 is 0, but is different from the third embodiment in that the control unit 12 alternately switches the third PWM mode and the fourth PWM mode in the second modulation mode period TM2 at a cycle shorter than ⅙ of one electrical angle cycle of the AC waveform appearing at the connection terminal of the power conversion circuit 11.

FIG. 8 is a diagram illustrating an example of a U-phase high-side gate signal G1, a V-phase high-side gate signal G3, and a W-phase high-side gate signal G5 output during a period in which the control unit 12 according to the fifth embodiment operates in each of the first modulation mode, the second modulation mode, and the third modulation mode.

As illustrated in FIG. 8, in a case where the second mode ratio Rm2 is 1, the control unit 12 operates only in the first PWM mode close to the characteristic of the two-phase modulation over the entire period of the second modulation mode period TM2. That is, the second modulation mode period TM2 is equal to the first PWM mode period T1. In the example illustrated in FIG. 8, in the second modulation mode period TM2, the control unit 12 alternately switches the third PWM mode and the fourth PWM mode in a cycle shorter than ⅙ of one electrical angle cycle, for example, a cycle corresponding to 2.5 cycles of pulse width modulation. That is, in the second modulation mode period TM2, the high-side continuous ON period T1H and the low-side continuous ON period T1L alternately appear in a cycle corresponding to 2.5 cycles of pulse width modulation.

As illustrated in FIG. 8, in a case where the third mode ratio Rm3 is 0, the control unit 12 operates only in the second PWM mode corresponding to the three-phase modulation over the entire period of the third modulation mode period TM3. That is, the third modulation mode period TM3 is equal to the second PWM mode period T2.

In the example illustrated in FIG. 8, the control unit 12 alternately switches the third PWM mode and the fourth PWM mode to the first PWM mode in the first modulation mode period TM1. As a result, as illustrated in FIG. 8, in the first modulation mode period TM1, the high-side continuous ON period T1H and the low-side continuous ON period T1L alternately appear as the first PWM mode period T1 with the second PWM mode period T2 interposed therebetween. As in the third embodiment, in the first modulation mode period TM1, the control unit 12 continuously or stepwise changes the first mode ratio Rm1 within the range represented by the above Expression (1).

For example, as described above, in a case where the control unit 12 alternately switches the third PWM mode and the fourth PWM mode in the second modulation mode period TM2 at a cycle corresponding to 2.5 cycles of pulse width modulation, the number of switching operations in the second modulation mode period TM2 is 11/15 times the number of switching operations in the third modulation mode period TM3. Therefore, according to the fifth embodiment, the switching loss in the second modulation mode period TM2 can be reduced as compared with the third modulation mode period TM3.

According to the fifth embodiment, similarly to the fourth embodiment, the control unit 12 continuously or stepwise changes the first mode ratio Rm1 in the first modulation mode period TM1 between the second modulation mode period TM2 and the third modulation mode period TM3, so that the shift of the modulation mode gradually proceeds between the second modulation mode close to the characteristic of the two-phase modulation and the third modulation mode corresponding to the three-phase modulation. Further, since it is possible to suppress a sudden change in switching loss and a sudden change in noise due to switching of the modulation mode, it is possible to reduce a torque fluctuation of the motor 20 and to prevent the user from feeling uncomfortable.

The present invention is not limited to the above embodiments, and the configurations described in the present description can be appropriately combined within a range not conflicting with one another.

For example, in a case where the third embodiment is applied, the first mode ratio Rm1 in the first modulation mode period TM1 may be changed according to the specific example illustrated in FIG. 9. FIG. 9 illustrates a specific example in a case where the mode switching cycle TS is fixed to four cycles of pulse width modulation, and a specific example in a case where the mode switching cycle TS is not fixed to a constant value and is variable.

For example, in a case where the fifth embodiment is applied, the first mode ratio Rm1 in the first modulation mode period TM1 may be changed according to the specific examples illustrated in FIG. 10. FIG. 10 illustrates a specific example in a case where the mode switching cycle TS is fixed to 4.5 cycles of pulse width modulation, and a specific example in a case where the mode switching cycle TS is not fixed to a constant value and is variable.

For example, in the above embodiment, the power conversion device 10 that controls the motor 20 which is a three-phase motor is exemplified, but the motor 20 to be controlled is not limited to a three-phase motor, and may be an N-phase motor (n is an integer of three or more). In the above embodiment, the IGBT is exemplified as each arm switch included in the power conversion circuit 11, but each arm switch may be, for example, a high-power switching element other than the IGBT such as a MOS-FET.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device comprising:
a power conversion circuit that performs mutual conversion between DC power and N-phase AC power (N is an integer of 3 or more); and
a control unit that controls 2N switches included in the power conversion circuit in a first modulation mode, wherein
in the first modulation mode, the control unit periodically switches between a first PWM mode in which a high-side switch or a low-side switch of one phase among the 2N switches is fixed to be turned on and switches of remaining phases are controlled by pulse width modulation and a second PWM mode in which switches of all phases among the 2N switches are controlled by the pulse width modulation, a sum of a first period in which the control unit operates in the first PWM mode and a second period in which the control unit operates in the second PWM mode is shorter than ½N of one electrical angle cycle of an AC waveform appearing at a connection terminal of the power conversion circuit, the first period has a length equal to or longer than one cycle of the pulse width modulation, and a ratio of the first period to a sum of the first period and the second period is variable.

2. The power conversion device according to claim 1, wherein when switching a modulation mode between a second modulation mode in which the ratio is a first ratio and a third modulation mode in which the ratio is a second ratio smaller than the first ratio, the control unit operates in the first modulation mode in a period between a period in which the control unit operates in the second modulation mode and a period in which the control unit operates in the third modulation mode, and changes the ratio continuously or stepwise in a period in which the control unit operates in the first modulation mode.

3. The power conversion device according to claim 2, wherein the first ratio in the second modulation mode is 1.

4. The power conversion device according to claim 2, wherein the second ratio in the third modulation mode is 0.

5. The power conversion device according to claim 2, wherein in the first period, the control unit switches between a third PWM mode in which a high-side switch of one phase among the 2N switches is fixed to be turned on and switches of remaining phases are controlled by the pulse width modulation and a fourth PWM mode in which a low-side switch of one phase among the 2N switches is fixed to be turned on and switches of remaining phases are controlled by the pulse width modulation in a cycle shorter than ½N of one electrical angle cycle.

6. The power conversion device according to claim 5, wherein a period in which the control unit operates in the third PWM mode coincides with a period in which the control unit operates in the fourth PWM mode in the first period included in a period in which the control unit operates in the first modulation mode.

7. The power conversion device according to claim 5, wherein a period in which the control unit operates in the third PWM mode coincides with a period in which the control unit operates in the fourth PWM mode in the first period included in a period in which the control unit operates in the second modulation mode.

8. The power conversion device according to claim 1, wherein in the first period, the control unit switches between a third PWM mode in which a high-side switch of one phase among the 2N switches is fixed to be turned on and switches of remaining phases are controlled by the pulse width modulation and a fourth PWM mode in which a low-side switch of one phase among the 2N switches is fixed to be turned on and switches of remaining phases are controlled by the pulse width modulation in a cycle shorter than ½N of one electrical angle cycle.

9. The power conversion device according to claim 8, wherein a period in which the control unit operates in the third PWM mode coincides with a period in which the control unit operates in the fourth PWM mode in the first period.

* * * * *